(12) United States Patent
Coffman

(10) Patent No.: US 6,529,972 B1
(45) Date of Patent: Mar. 4, 2003

(54) MESSAGE TRANSLATION AND DATA PROXY SERVICE FOR REMOTE DATA TRANSPORT IN A COMPUTER NETWORK

(75) Inventor: Jerrie L. Coffman, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/371,034

(22) Filed: Aug. 10, 1999

(51) Int. Cl.[7] .............................................. G06F 15/05
(52) U.S. Cl. ....................................................... 710/56
(58) Field of Search ................................ 710/1, 2, 3, 4, 710/5, 13, 56; 709/200, 201, 203, 217, 218, 219, 250

(56) References Cited

U.S. PATENT DOCUMENTS

| | | | | |
|---|---|---|---|---|
| 5,113,502 A | * | 5/1992 | Merrill et al. ............... 709/102 |
| 5,195,089 A | * | 3/1993 | Sindhu et al. ............... 370/235 |
| 5,497,480 A | * | 3/1996 | Hayes et al. ................ 711/166 |
| 5,613,071 A | * | 3/1997 | Rankin et al. ................ 707/10 |
| 5,632,016 A | * | 5/1997 | Hoch et al. .................. 710/30 |
| 6,021,464 A | * | 2/2000 | Yao et al. ...................... 710/41 |
| 6,347,337 B1 | * | 2/2002 | Shah et al. .................. 709/224 |

OTHER PUBLICATIONS

Virtual Interface Architecture Specification, Version 1.0 (Dec. 16, 1997), at http://www.viarch.org.
Intelligent I/O ($I_2O$) Architecture Specification, Version 1.5 (Mar., 1997), at http://www.i2osig.org/Architecture.

* cited by examiner

Primary Examiner—Moustafa M. Meky
(74) Attorney, Agent, or Firm—Kenyon & Kenyon

(57) ABSTRACT

In a message translation method, a message is received and a determination is made whether the message is a request or a reply. For a request message, a proxy data buffer is allocated and address information in the request message is changed to refer to the proxy data buffer.

25 Claims, 3 Drawing Sheets

MESSAGE TRANSLATION AND DATA PROXY SERVICE FOR REMOTE DATA TRANSPORT IN A COMPUTER NETWORK

BACKGROUND OF THE INVENTION

The present invention relates to an interface protocol for use throughout computer networks to provide remote access for a component to memory elements that may not be members of the component's universal memory space.

Modern computer networks are populated by a number of different network components such as terminals, servers and peripheral devices. Consider a server 100 as shown in FIG. 1. As shown, the server 100 may be populated by one or more central processing units ("CPUs") 110-1 through 110-N, a memory controller 120, system memory 130, on I/O bridge 140 and a plurality of 1/0 150–170 devices. Each of the input/output devices 150, 170 may be so-called "intelligent peripherals" including an IO processor ("IOP") 152, 162, 172 and peripheral components 154, 164, 174.

Such modern networks increasingly are providing peripheral devices as adjuncts to a computer network, not as adjuncts to individual components. Thus, a server 100 may communicate with additional peripherals 191, 192, 193 via a "network fabric" 180. As used herein, "network fabric" refers to network components (not shown) that may facilitate communication between two components of a computer network. Each of the additional peripherals 191, 192, 193 may include its own IOP 194, 195, 196.

IOPs are advantageous for use in computer networks because they reduce the processing load of CPUs. Prior to the advent of IOPs, CPUs managed incremental operation of peripheral devices. IOPs now manage these functions when commanded by a CPU. Thus, if a disk drive 160 were commanded to write to disk a predetermined amount of data from system memory 130, a CPU (say, 110-1) need only issue a write command to the IOP 162 identifying the location and size of the data to be written to disk. Thereafter, the IOP 162 issues bus transactions and other control commands to cause the data to be furnished from the memory 130. It retrieves the data from the memory 130 via the memory controller 140 and causes it to be written to disk. When all the data is stored to disk, the IOP 162 typically communicates with the CPU 110 identifying that the command has been completed. In this sense, the operation of servers is well-known. Further, network communication protocols are known for such purposes, such as the Intelligent I/O (I₂O) Architecture Specification, Version 1.5 (March 1997) (available, as of the date of this writing, at http://www.i2osig.org/Architecture).

Performing data exchange across computer networks raises a new set of challenges. Computer networks are migrating toward a more distributed architecture in which peripheral devices possess local address spaces—they cannot gain direct access to the memory spaces of the hosts that may call them to perform I/O events. For example, a host 100 may communicate with a remote peripheral device 190 via the communication fabric 180. Accordingly, there is a need in the art for a communication protocol that provides for communication with intelligent peripherals that use a different address space than a requesting agent.

SUMMARY

Embodiments of the present invention provide a message translation method in which a message is determined as being a request message or a reply message. For a request message, a proxy data buffer is allocated and address information in the request message is changed to refer to the proxy data buffer.

DETAILED DESCRIPTION

Embodiments of the present invention provide a messaging patch for use by hosts and targets while performing I/O events. The messaging patch permits a remote target to operate according to techniques that had been established for use by local targets having direct access to a host's memory space. Because the remote target does not have direct access to the host's memory space, the patch converts messages between the host and the target and, as necessary, establishes proxy buffers that permit the target to operate as if it had direct access to the memory space. Conceptually, the messaging patch "lies" to the remote target, setting up a number of conditions that give the appearance that the target is acting locally when, in fact, the target is operating remotely.

Figure 2:
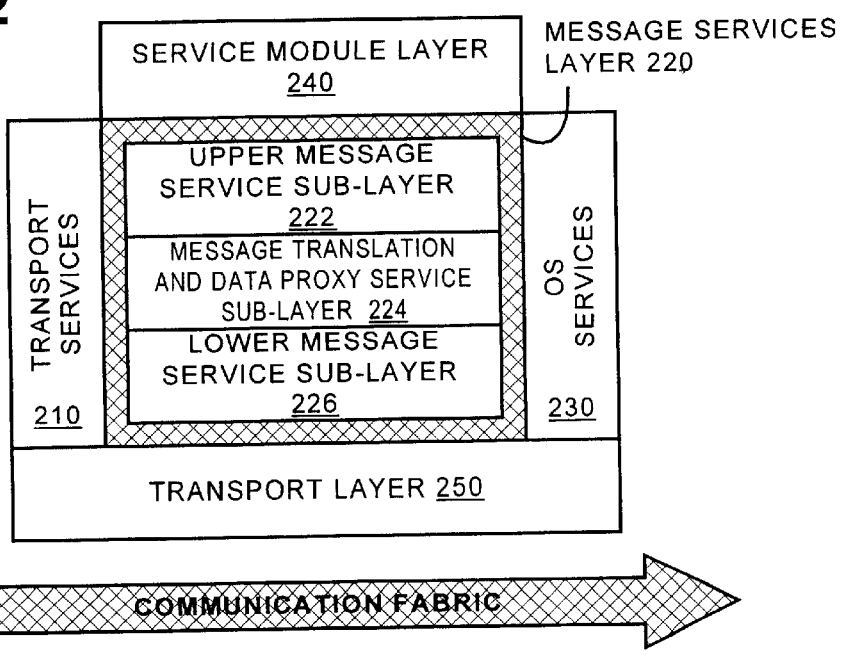
FIG. 2 is a diagram of a layered communication structure for a component of a computer network according to an embodiment of the present invention.

FIG. 2 is a diagram illustrating a messaging layered structure 200 according to an embodiment of the present invention. In an embodiment, hosts and targets both may operate in accordance with the structure 200. As is known, a messaging layered structure 200 may be organized into several "services," including:

- a transport service layer 210 that is used for moving blocks of data between modules;
- a message service layer 220 that communicates with other modules; and
- an OS services layer 230 used for the execution environment.

Further, the messaging service layer 220 interfaces with various service modules 240 and a transport layer 250. According to the present invention, the message service layer 220 may provide a communication service from one module to another. Message service layer 220 is a service provider; modules using this communication service are known as "service modules." Service modules may include both host-OS-specific modules and target-device-specific modules. Host-OS-specific modules may execute bn a CPU to generate IO requests and receive IO replies. Target-device-specific modules may execute on an IOP to receive IO requests and generate IO replies.

In the transport layer 250, communication messages are driven upon a communication fabric such as a communication bus.

An embodiment of the present invention further divides the message services layer 220 into a plurality of sub-layers, including an upper message service sub-layer 222, a message translation and data proxy service sub-layer 224 and a lower message service sub-layer 226. The upper message service sub-layer 222 and the lower message service sub-layer 226 interface with other layers in the communication process. The upper message service sub-layer 222 communicates with higher level layers such as the service module layer 240 shown in FIG. 2. Such service module layers 240 are known; typically, they initiate messages in formats that are determined by the operating system and/or applications that may be operating upon an agent. The upper message service sub-layer 222 receives messages, called original message frames, in a manner that preserves any signaling interface that may be required by the service module layer 240.

Similarly, the message services layer 220 may interface with lower level layers in the communication process, such as the transport layer 250 shown in FIG.2. The lower message service sub-layer 226 preserves any signaling interface required by the transport layer 250.

Within the message translation and data proxy service sub-layer 224 and according to embodiments of the present invention, methods may be provided that respond to the original message frames initiated by the service layers 240. Prior to processing by the message translation and data proxy service sub-layer 224, the original message frame first is fielded by the upper message service sub-layer 222. The upper message service sub-layer 222 maintains an order of possibly many message frames from the service module layer 240 and, as may be necessary, provides temporary buffer storage for each original message frame. For each original message frame, the upper message service sub-layer 222 issues a call to the message translation and data proxy service sub-layer 224 to deliver a message frame. Call parameters may define a peripheral identifier to be used to execute the request (called a "service context") and a pointer to a local address in which data associated with the request is located.

Figure 1:
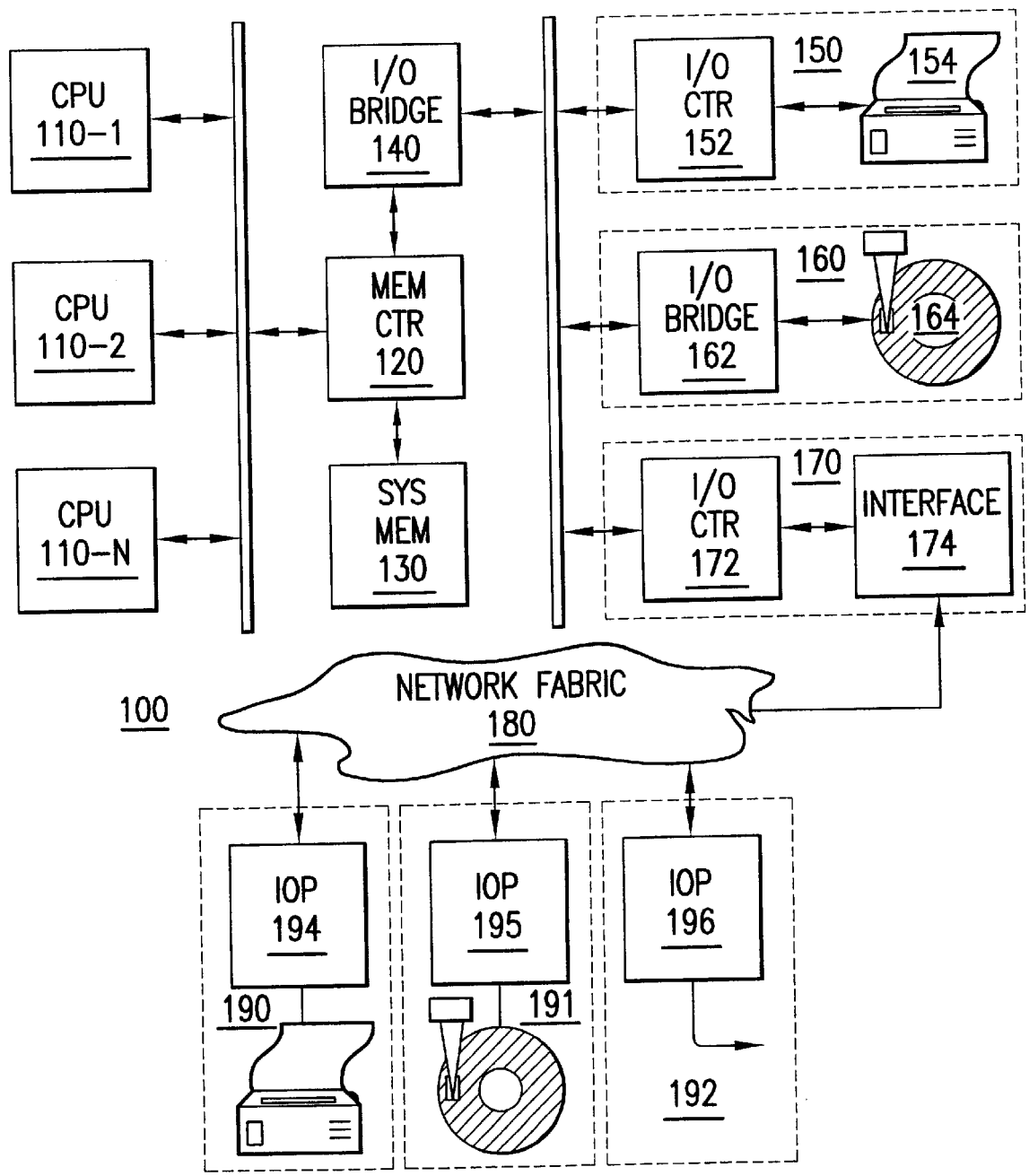
FIG. 1 is a block diagram of a conventional computer network.

As is known, an original message frame may include data representing whether the original message frame is a request or a reply. A request is a communication that initiates a transaction with a remote agent across the communication fabric (FIG. 1). A reply is a communication that concludes a transaction with a remote agent across the communication fabric. The original message frame may include data such as a request/reply flag or a request type that distinguishes between requests and replies.

Figure 3:
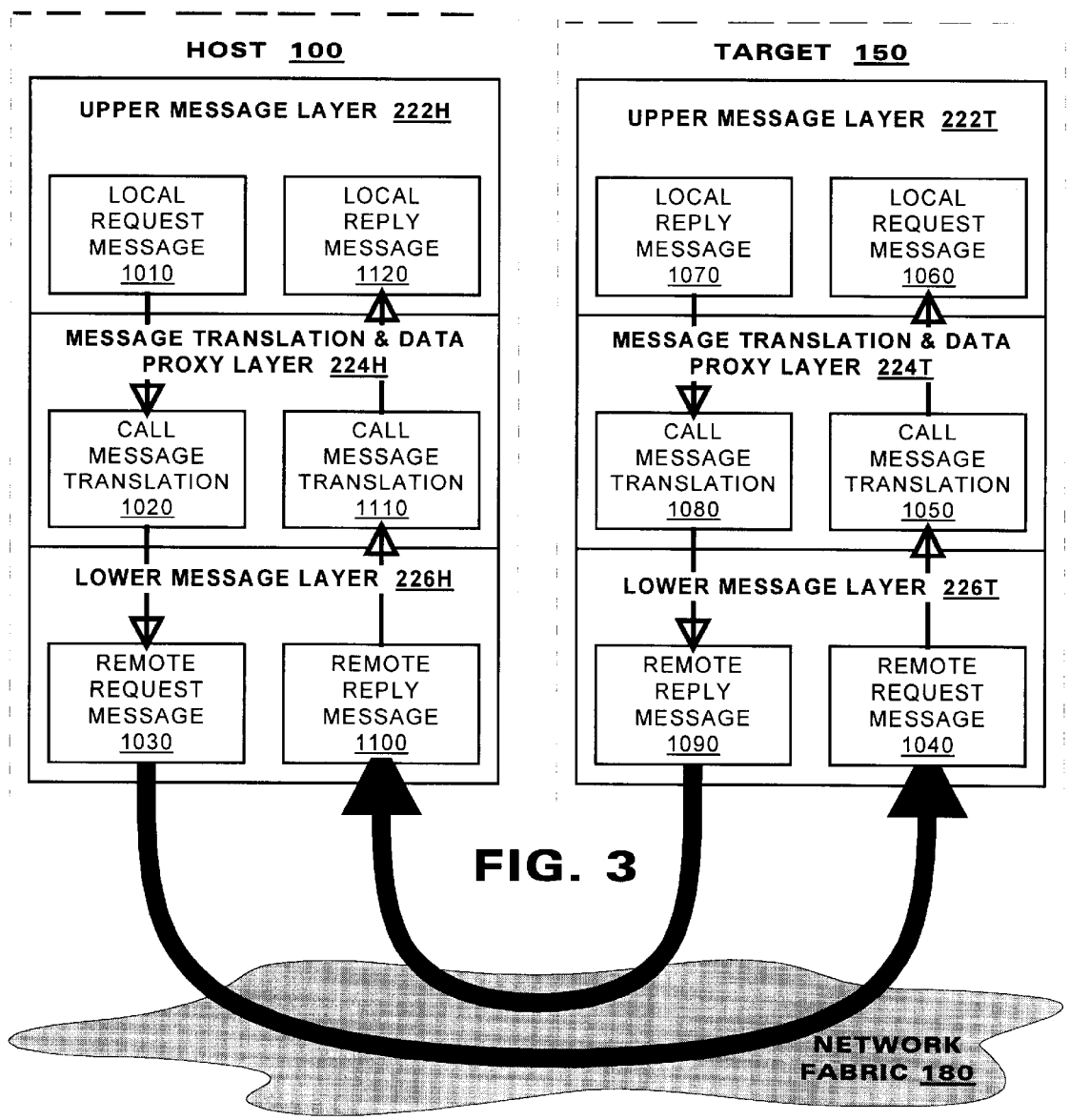
FIG. 3 is a diagram illustrating message flow at the computer network according to an embodiment of the present invention.

FIG. 3 is a flow diagram representing the operation at the host 100 and the target 150 of the three messaging layer sub-layers 222H–226H, 222T–226T during processing of an I/O event according to an embodiment of the present invention. When a host 100 determines to request an I/O event, its service module layer (not shown) generates a local request message to the upper messaging sub-layer 222H (Step 1010). The local request message at the host 100 is of a form and format that is determined by the service module that generates it. The upper messaging sub-layer 222H calls the message translation patch which generates a remote request message from the local request message (Step 1020). When the patch concludes, the lower messaging sub-layer 226H outputs the remote request message to the transport layer (not shown) and the remote request message is output to the fabric 180 (Step 1030).

At the target 150, the lower message sub-layer 226T receives the remote request message according to the functionality of the target's transport layer (not shown) (Step 1040). It calls the message translation patch which generates a local request message from the remote request message (Step 1050). The local request message at the target is of a form and format determined by the service module at the target 150. Thus, the form of the local request message at the host 100 may be different than the form of the local request message at the target 150. When the patch concludes, the local request message propagates to the upper message sub-layer 222T (Step 1060) and further to the service module layer (not shown).

At the conclusion of Step 1060, the target 150 has received the request for an I/O event and may execute whatever processes may be necessary to execute the request.

Upon completion of the request, the target's upper message sub-layer 222T receives a local reply message from the target's service module layer (Step 1070). The local reply message is of a form and format determined by the target's service module layer (not shown). The upper messaging sub-layer 222T calls the message translation patch in which the local reply message is translated into a remote reply message (Step 1080). When the patch concludes, the remote reply message propagates to the lower message sub-layer 226T (Step 1090), to the transport layer (not shown), and further to the communication fabric 180.

At the host 100, the lower message sub-layer 226H receives the remote reply message from the communication fabric via the transport layer (not shown) (Step 1100). It calls the message translation patch in which a local reply message is generated of a form and format to be determined by the service module layer of the host 100. (Step 1110). When the patch concludes, the local reply message propagates to the upper service sub-layer 222H (Step 1120) and further to the host's service module (not shown). The I/O event concludes.

Figure 4:
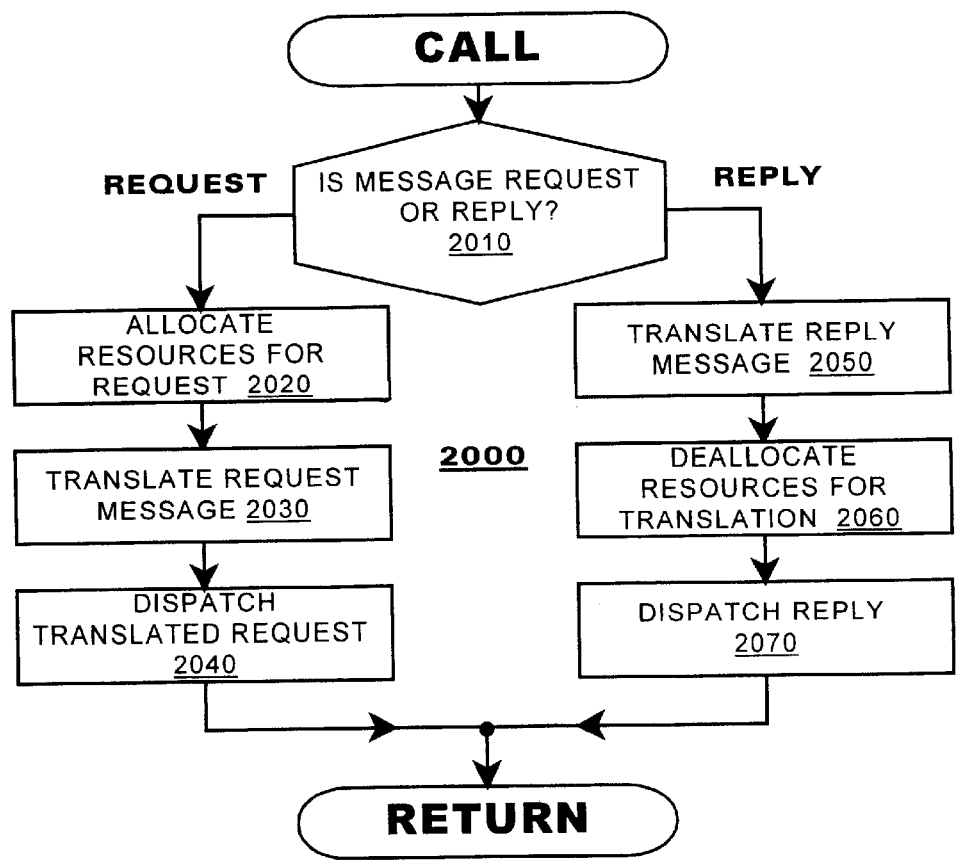
FIG. 4 is a flow diagram of a message translation patch according to an embodiment of the present invention.

FIG. 4 illustrates a method 2000 of operation of the message translation patch according to an embodiment of the present invention. The method 2000 may be initiated by a call from either the upper message services sub-layer 222T, 222H (FIG. 3) or the lower message services sub-layer 226H, 226T (FIG. 3) whenever either sub-layer receives a message from an external layer (the service module layer 240 or the transport layer 250 (FIG. 2)).

In response to the call, the message translation patch 2000 tests the message to determine whether it is a request or a reply (Step 2010). If the message is a request and if operating on the target 150 (FIG. 3), the message translation patch 2000 may establish a proxy data buffer (Step 2020). In case of a write request, Data transfer may occur as part of the step of establishing the proxy data buffer. The message translation patch 2000 translates addresses in the message (Step 2030). The message translation patch 2000 also dispatches the request and returns to the calling layer (Step 2040).

At step 2020, the message translation patch 2000 establishes a proxy data buffer at the target for use in implementing the transaction. The remote request message will include information representing the length of data to be transferred in the I/O event. The message translation patch 2000 establishes a proxy data buffer of sufficient size to accommodate the length of data to be transferred.

At step 2030, the message translation patch 2000 performs message translation. At the host, the local request message identifies data using an address that is relevant in its local address space, such as a scatter-gather-list (SGL) oral address of a pointer to an SGL. The message translation patch 2000 converts the address to a "handle," an arbitrary label. Address resolution may occur at the host 100 via hardware transport at the host (not shown) according to the "Virtual Interface Architecture Specification, Version 1.0 (Dec. 16, 1997) (available, as of the date of this writing, at http://www.viarch.org) (herein the "VI Specification"). Thus, the hardware transport develops an association between the handle and the local address space at the host to which it refers. Once data transfer is to be initiated, the target 150 will issue transfer commands using a reference to the handle and the hardware transport at the host will furnish data using the association to the local address space. Such data transfer would not be accomplished by the message handling layer 220 (FIG. 2) of the host but rather by the transport services later 210.

At the target 150, address translation translates the identifier of the handle to an address of the proxy data buffer. When the target 150 initiates data transfer across the remote fabric 180 (FIG. 1), it does so using transfer commands referencing the handle. When the target 150 initiates data transfer within the peripheral (such as when IOP 162 writes to disk 164 (FIG. 1)), it does so using transfer commands referencing the address of the proxy data buffer.

As is known, communication protocols may become outdated for new applications. For example, the $I_2O$ specification, version 1.5 (cited hereinabove) does not support the remote addressing achieved by the patch of the present invention. A remote target that operates according to the $I_2O$ v. 1.5 standard at the service module layer may be integrated with a remote addressing protocol using the patch. Not only does the patch convert addresses as has been discussed, but it also may translate among request types.

For example, request at the service module layer may include a request type identifying the typed I/O event to be performed upon identified data. The patch 2000 may identify the request type from the request at the service module layer and substitute for the request type a different message that identifies the request according to the protocol of the network fabric.

If, at Step 2010, the original message frame was a reply, the method 2000 translates the reply message (Step 2050). Further, if operating at the target, the method 2000 may disassemble a proxy data buffer that may have been established for the I/O event. (Step 2060). If the request was a read, data transfer may occur as part of the step of disassembling the proxy data buffer. The method dispatches the reply and returns to the calling layer. (Step 2070).

At both the host and the target, translation may involve message translation. As has been discussed, the service modules of both the host and the target may operate according to conventions that are not shared by the transport layer. For example, the service module layer 240 (FIG. 2) of a target may operate according to the conventions established for the $I_2O$ Specification Architecture, Version 1.5 but the transport layer 250 may operate according to some later-generation protocol of the same standard or over an entirely different protocol. In such a case, the signaling formats at the service module layer 240 and the transport layer 250 may be different. According to an embodiment of the present invention, message translation may be introduced to convert among the formats of signals that are processed at the layers. Message translation is known per se.

In an embodiment, the patch 2000 of FIG. 4 translates the request and reply messages themselves as they propagate through hosts and targets in the system. The patch 2000 does not participate in the transfer of data between the host and the target. As described, data transfers are initiated by the target. Data transfers may be made according to conventional processes, such as by the remote direct memory access process described in the VI Specification.

In the case where data is written from the host to the target, data transfer will occur prior to the execution of the request. In this way, data will be stored in the data proxy buffer prior to the time that the service module layer of the target 150 executes the I/O event and performs the requested write command.

In the case where data is read from the target to the host, data transfer will occur prior to the propagation of a reply message from the target to the host. In this way, data will have been read from the data proxy buffer prior to the time that the reply is transferred to the host.

The methods of the present invention may be performed, in an embodiment, by operating systems of the host and the target. In such an embodiment, the method may be stored as program instructions in a storage device, such as an electrical, magnetic or optical memory and loaded onto the host or target upon initialization.

According to an embodiment, a target 150 that operates according to the present invention typically will include a fixed, predetermined limit to the amount of data that it may buffer in a proxy data buffer. It will be appreciated that a target 150 may operate on multiple, independent I/O events in parallel, each of which may be allocated its own proxy data buffer. In an embodiment, received request messages from the service module layer 240 or the transport layer 250 may be entered into a pipelined queue (not shown) at the target for sequential processing at the target 150. If the size of a proxy buffer associated with a pending message would cause the aggregate size of all proxy buffers to exceed the predetermined limit of buffer space at the target 150, the target 150 may stall the patch until other allocated buffer space becomes deallocated. By stalling the next pending message, it simultaneously stalls other later received request messages.

Several embodiments of the present invention are specifically illustrated and described herein. However, it will be appreciated that modifications and variations of the present invention are covered by the above teachings and within the purview of the appended claims without departing from the spirit and intended scope of the invention.

I claim:

1. A message translation method, comprising:

receiving a message, determining whether the message is a request message or a reply message, and for a request message, allocating a proxy data buffer for the message and translating address information from the request message to refer to an address of the proxy data buffer.

2. The method of claim 1, further comprising, for a reply message, deallocating a proxy data buffer associated with the message.

3. The method of claim 1, further comprising converting message formats among a service module layer format and a transport layer format.

4. A message translation method at a target, comprising:

receiving a request message at a transport layer of the target, the request message including an address handle, based upon the request message, establishing a proxy data buffer, in the request message, substituting an address of the proxy data buffer for the address handle, and outputting the request message to a service module layer of the target.

5. The method of claim 4, further comprising performing an I/O function based upon the translated request message.

6. The method of claim 4, further comprising:

receiving a reply from the service module layer, deallocating the proxy data buffer, and outputting the reply message to the transport layer.

7. The method of claim 6, further comprising, prior to the deallocating, transferring data out of the proxy data buffer.

8. The method of claim 7, wherein the transferring includes issuing a remote direct memory access request.

9. The method of claim 6, further comprising translating the reply message from a protocol of the service module layer to a protocol of the transport layer.

10. The method of claim 4, further comprising subsequent to the establishing, transferring data into the proxy data buffer.

11. The method of claim 10, wherein the transferring includes issuing a remote direct memory access request.

12. The method of claim 4, further comprising translating the request message from a protocol of the transport layer to a protocol of the service module layer.

13. A message translation method at a host, comprising:

receiving a request message from a service module layer of the host, substituting local address information in the request message with an address handle, the handle uniquely identifying the request, outputting the request message so substituted to a transport layer of the host, and after a target establishes a proxy data buffer, interfacing with the proxy data buffer based on the request message.

14. The method of claim 13, wherein the substituting comprises conversion of a virtual address/memory handle pair at a host into a table containing local physical addresses for remote DMA access.

15. The method of claim 13, further comprising, receiving a reply message at the transport layer, substituting the address handle with local address information of the request, and outputting the reply message so substituted to the service module layer.

16. In an intelligent peripheral of a computer network, a layered communication structure, comprising:

a service module layer defined by an operating system of the peripheral, a transport layer defined by a communication protocol to be used by the intelligent peripheral for extra-peripheral communication, a messaging layer having a messaging patch that, in response to a message received from the service module layer or the transport layer, causes the peripheral to:

determine whether the message is a request message or a reply message, and for a request message, establish a proxy data buffer for the message and translating address information within the request message to refer to an address of the proxy data buffer.

17. The peripheral of claim 16 wherein, in response to the request message, the service module layer causes the intelligent peripheral to perform an I/O function.

18. The peripheral of claim 16, wherein, for a reply message, the messaging translation patch causes the peripheral to deallocate a proxy data buffer associated with the reply message.

19. The peripheral of claim 18, wherein, prior to the deallocation, the peripheral transfers data out of the proxy data buffer.

20. The peripheral of claim 19, wherein the transfer occurs according to a remote direct memory access request issued by the peripheral.

21. The peripheral of claim 18, wherein the peripheral further translates the reply message from a protocol of the service module layer to a protocol of the transport layer.

22. The peripheral of claim 16, wherein subsequent establishment of the proxy data buffer, the peripheral transfers data into the proxy data buffer.

23. The peripheral of claim 22, wherein the transfer occurs according to a remote direct memory access request issued by the peripheral.

24. The method of claim 16, wherein the peripheral further translates the request message from a protocol of the transport layer to a protocol of the service module layer.

25. A computer readable medium containing program instructions that when executed by a processor, cause the processor to:

receive a message, determine whether the message is a request message or a reply message, and for a request message, allocate a proxy data buffer for the message and translate address information from the request message to refer to an address of the proxy data buffer.

* * * * *